Aug. 30, 1932.   E. L. WALKER ET AL   1,874,670
BOX MAKING MACHINE
Filed May 18, 1929   16 Sheets-Sheet 4
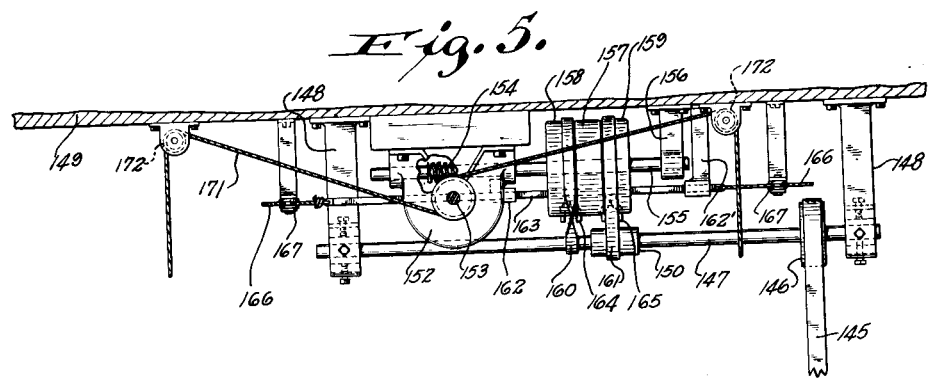
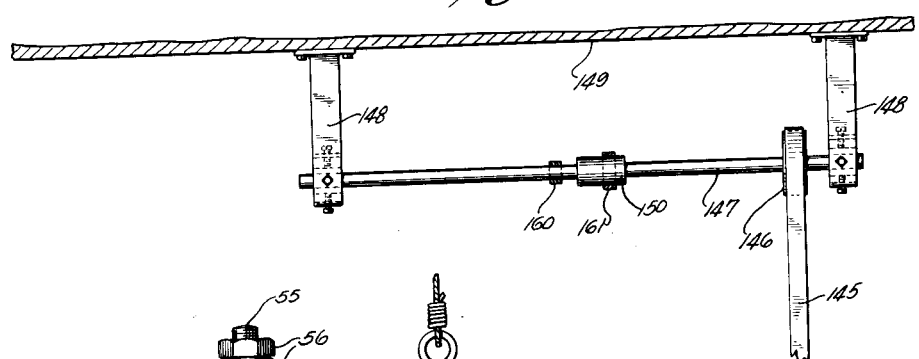
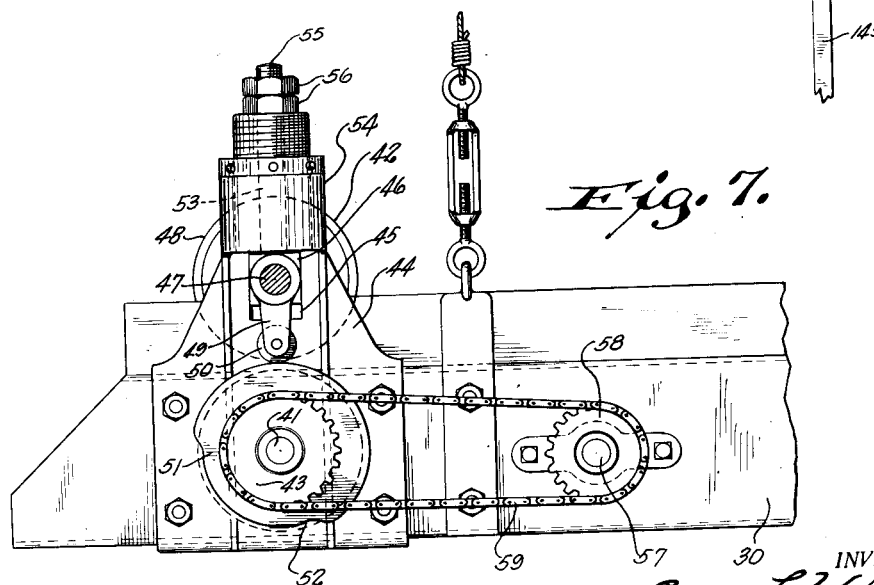
INVENTORS
Emery L. Walker
Arthur W. Werner
BY
Morsell, Kenny, Morsell
ATTORNEYS.

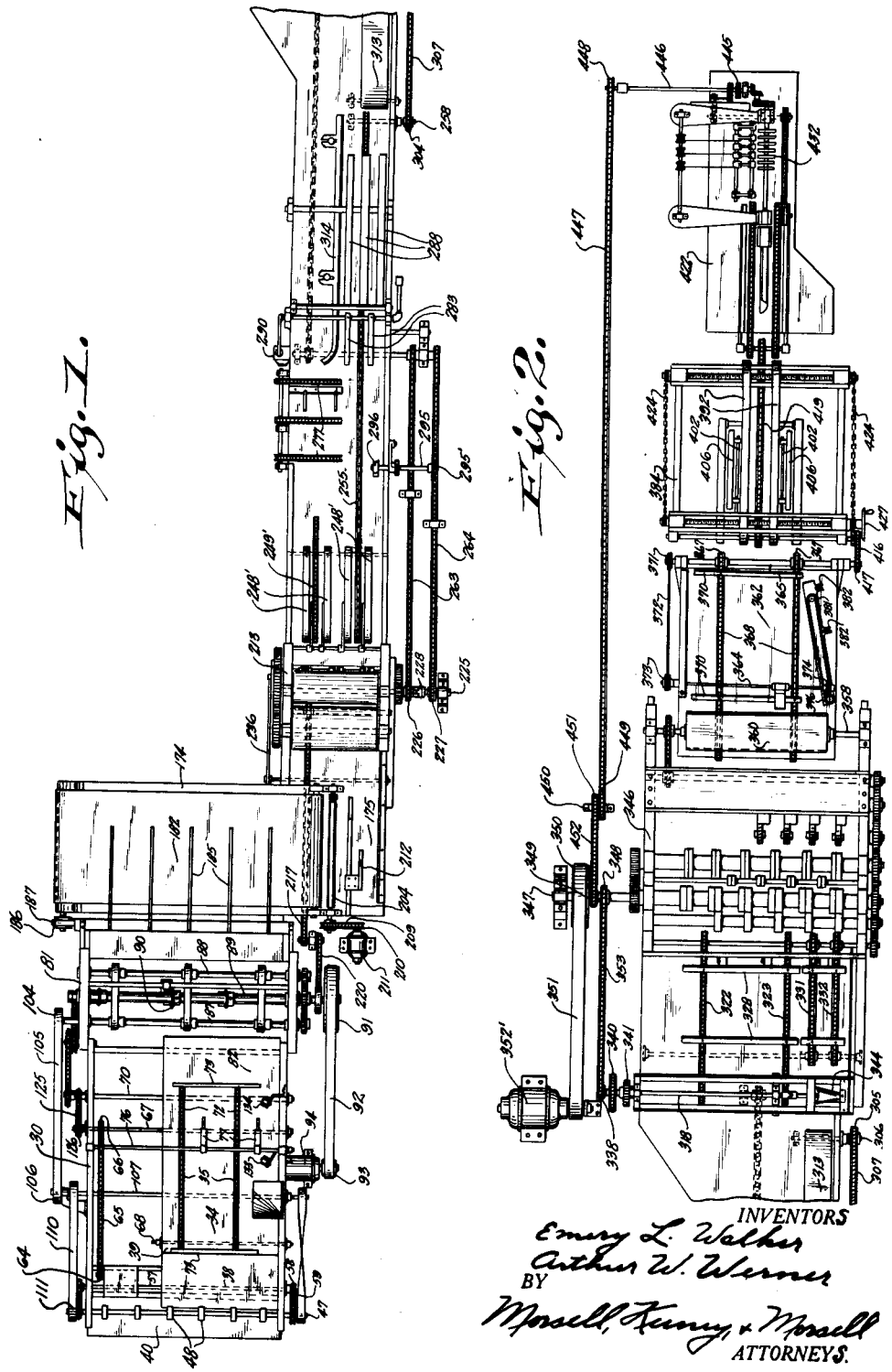

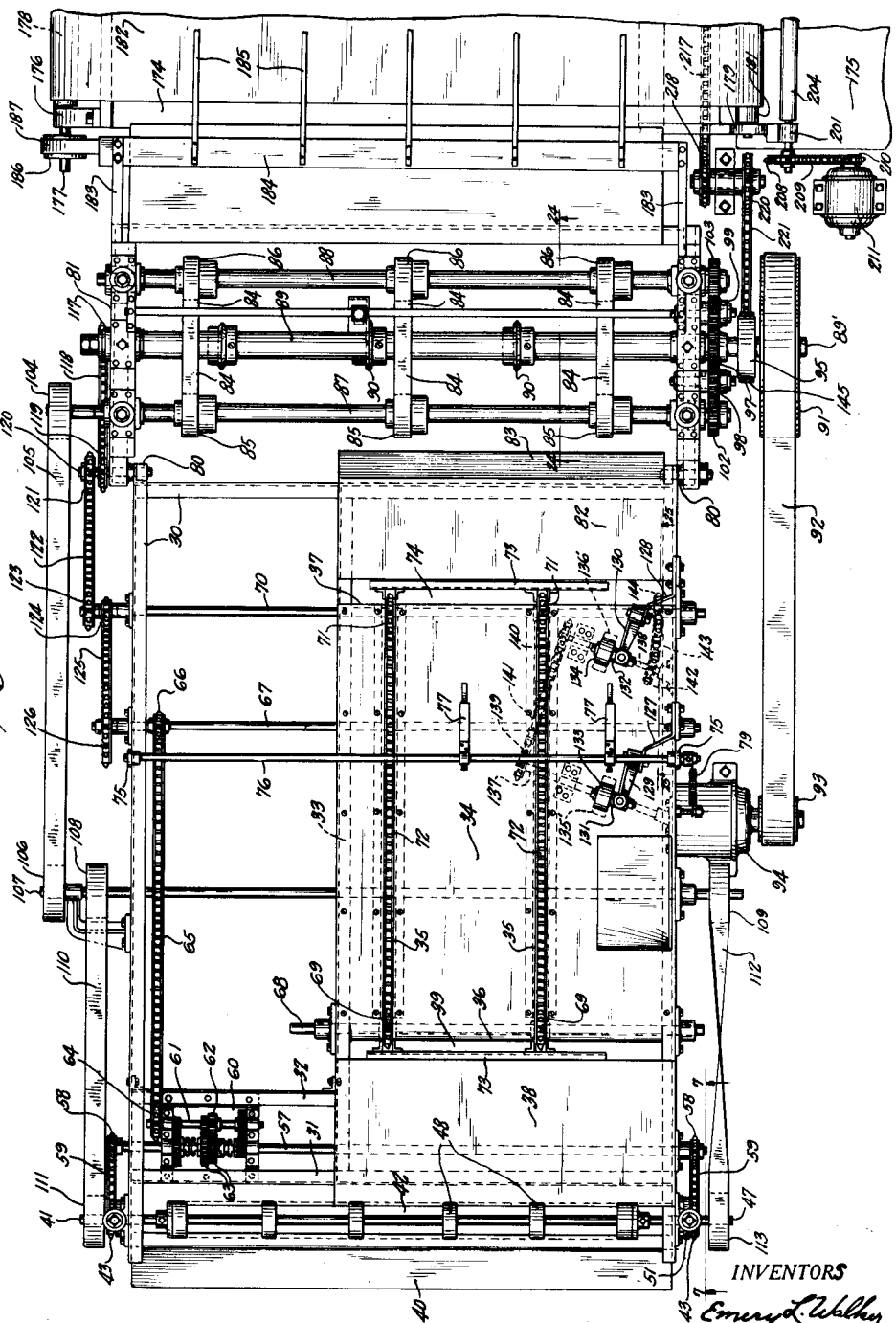

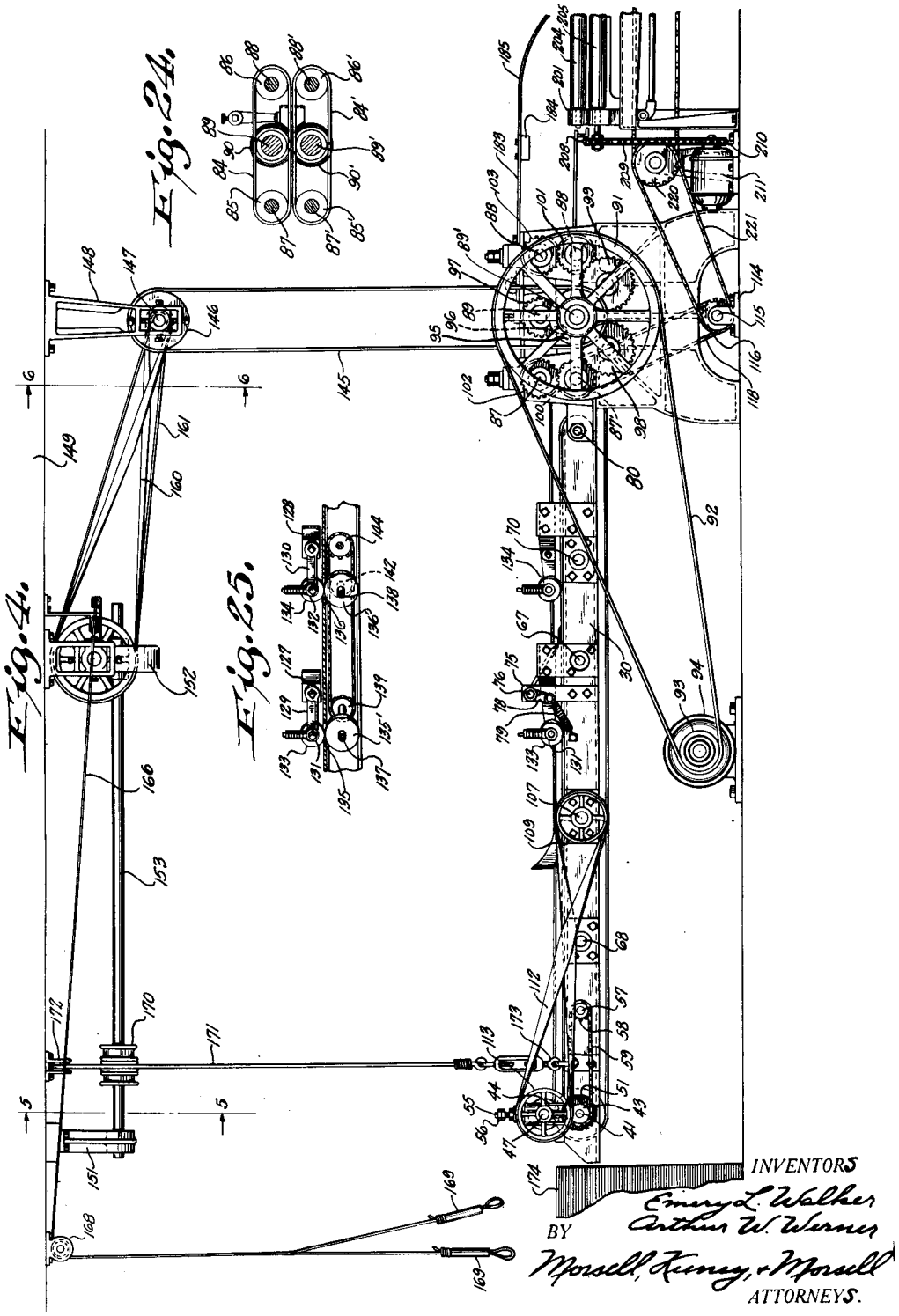

Aug. 30, 1932.   E. L. WALKER ET AL   1,874,670
BOX MAKING MACHINE
Filed May 18, 1929   16 Sheets-Sheet 5

INVENTORS
Emery L. Walker
Arthur W. Werner
BY Morsell, Keeney & Morsell
ATTORNEYS.

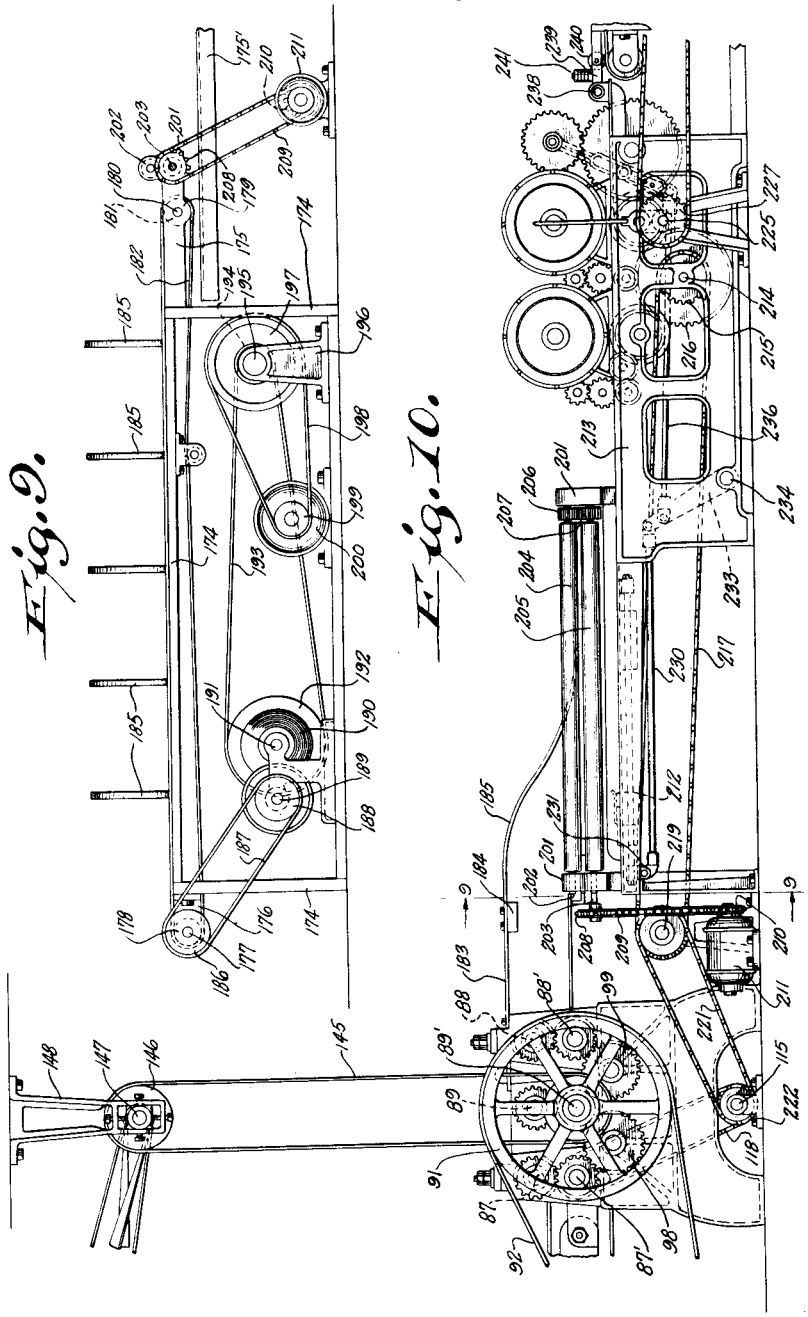

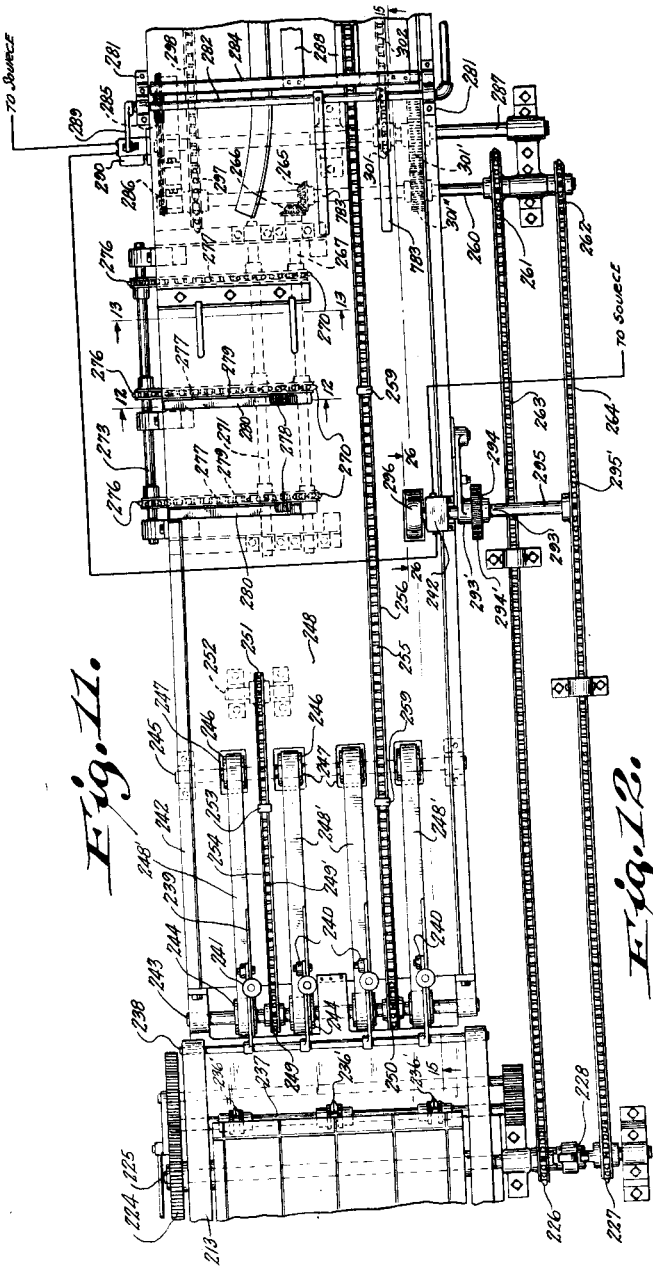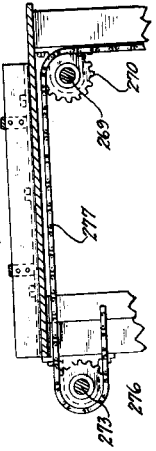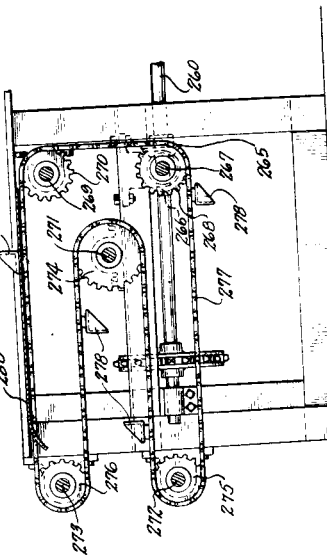

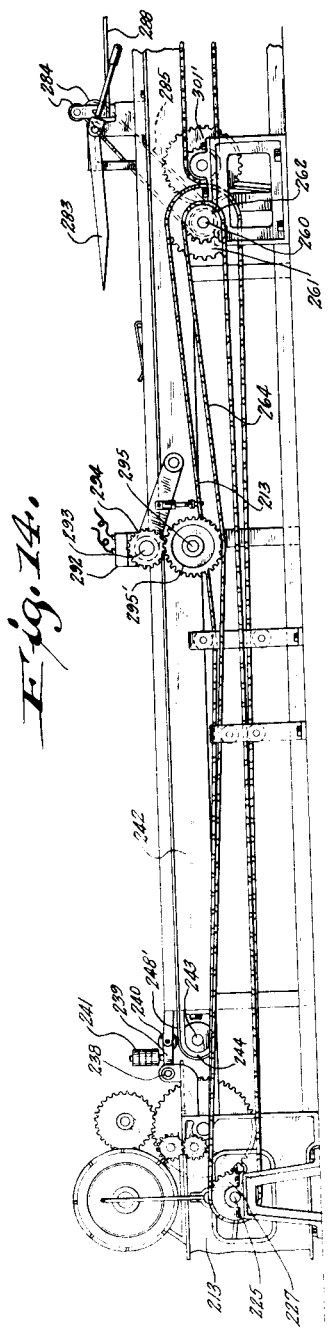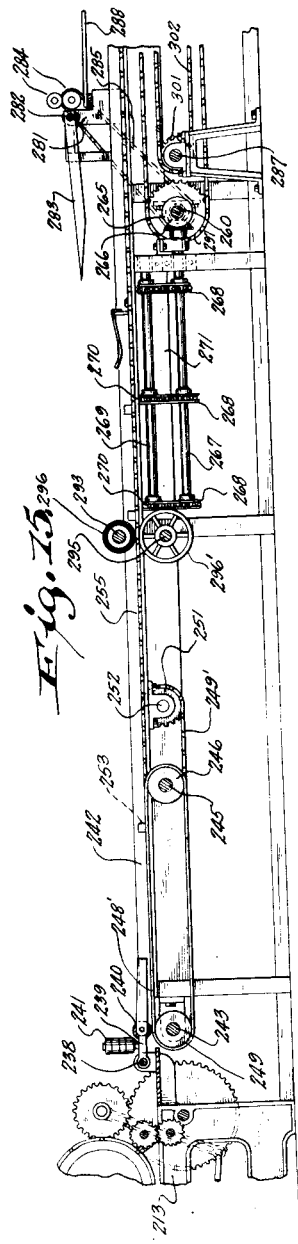

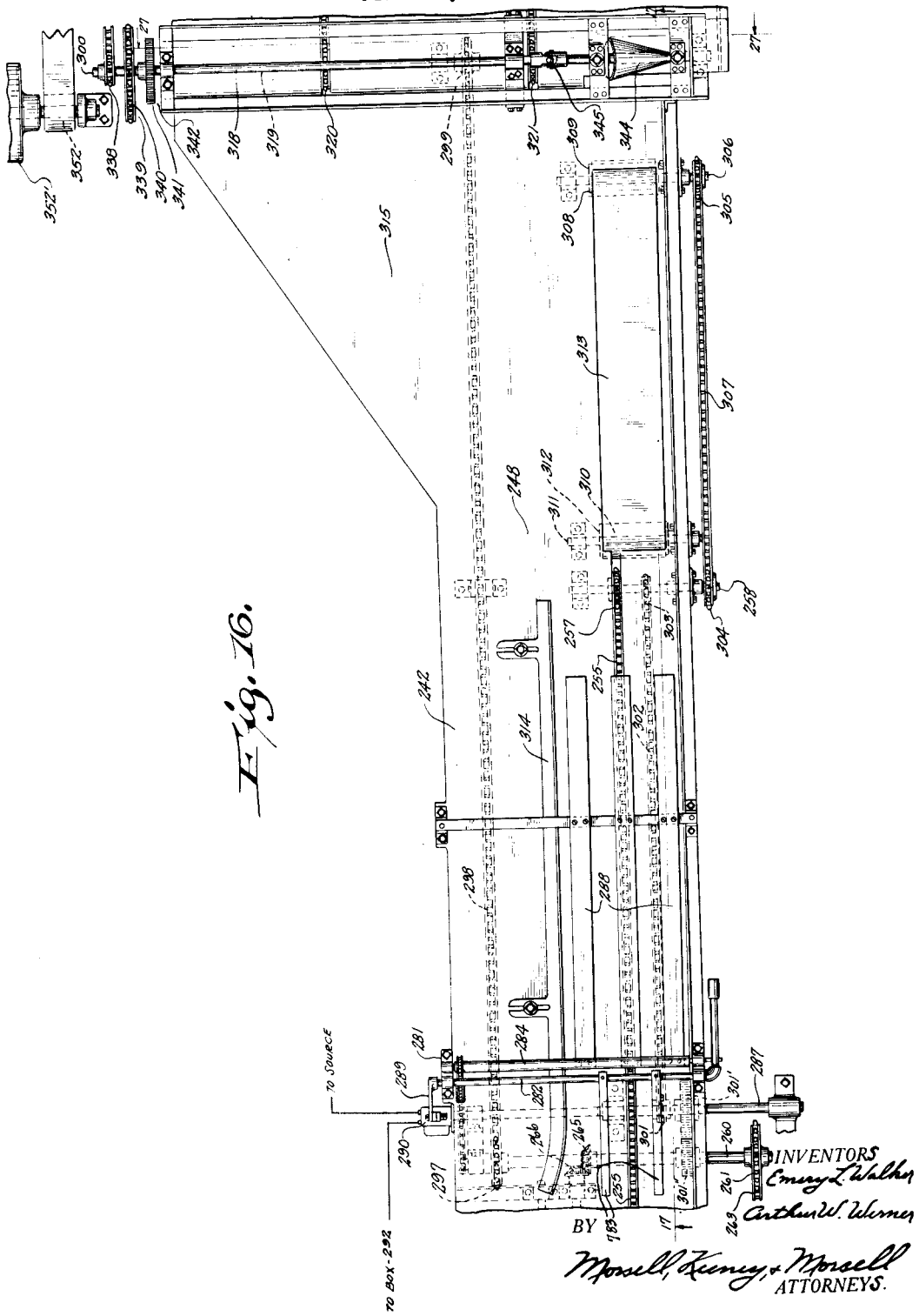

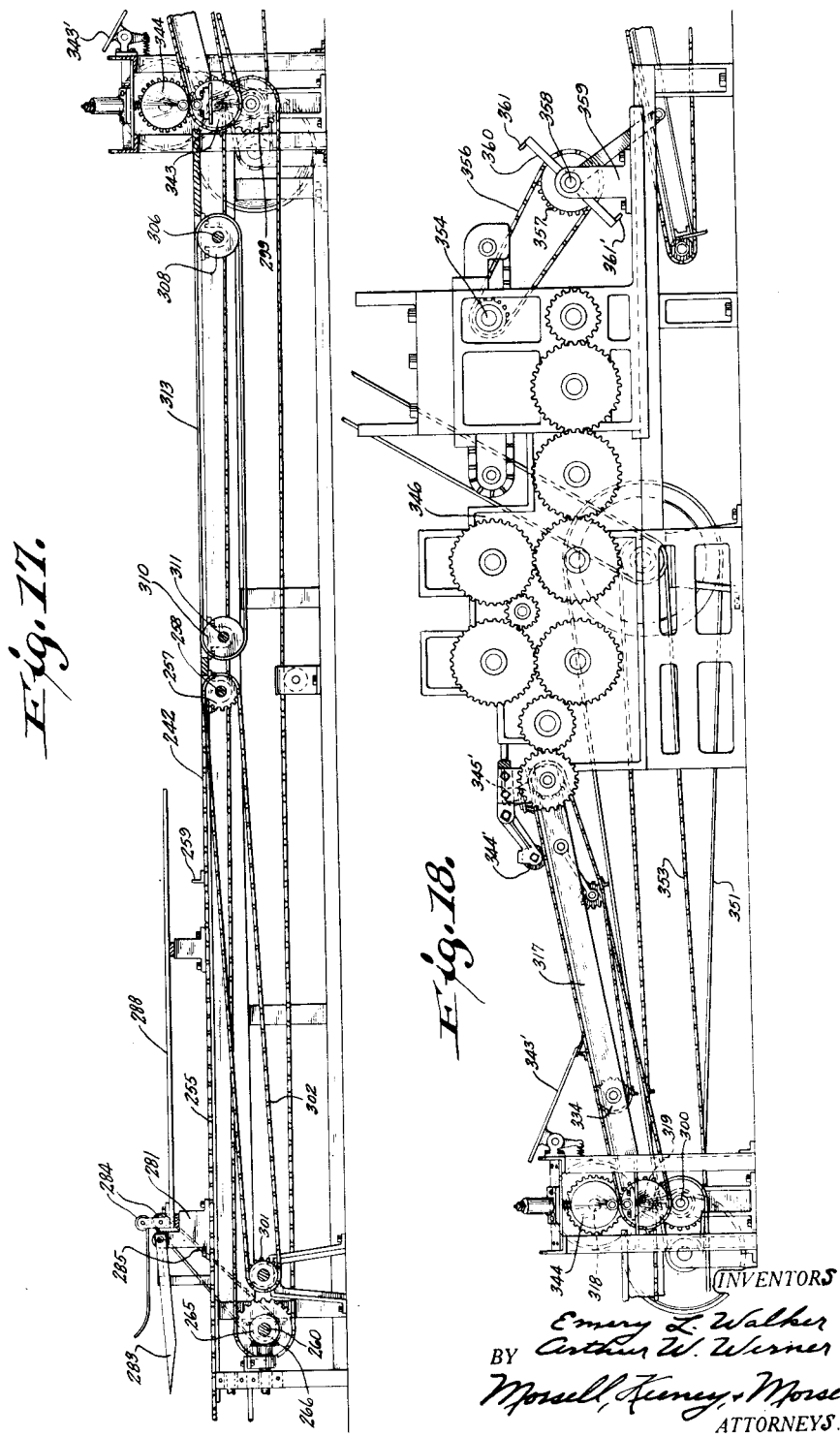

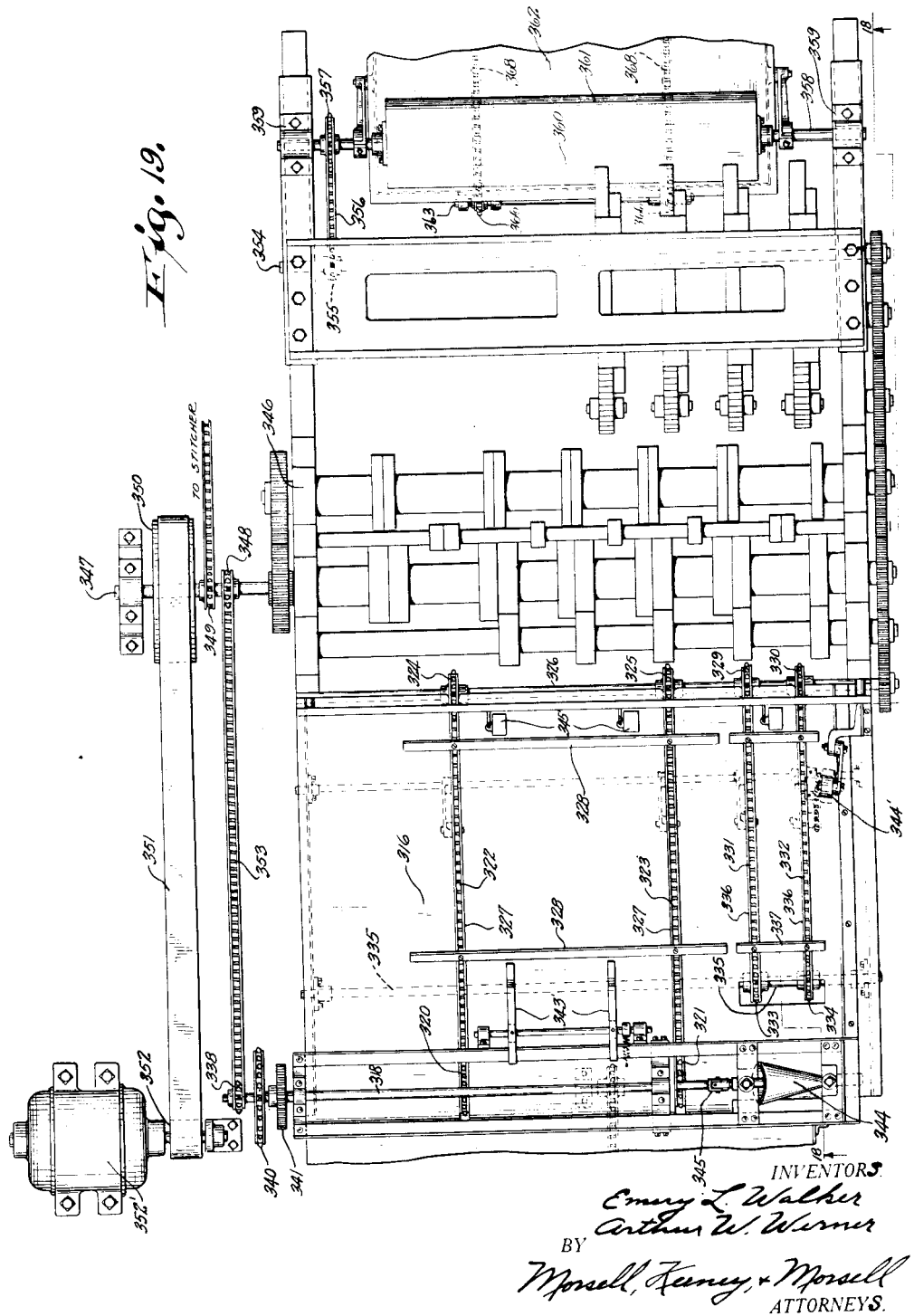

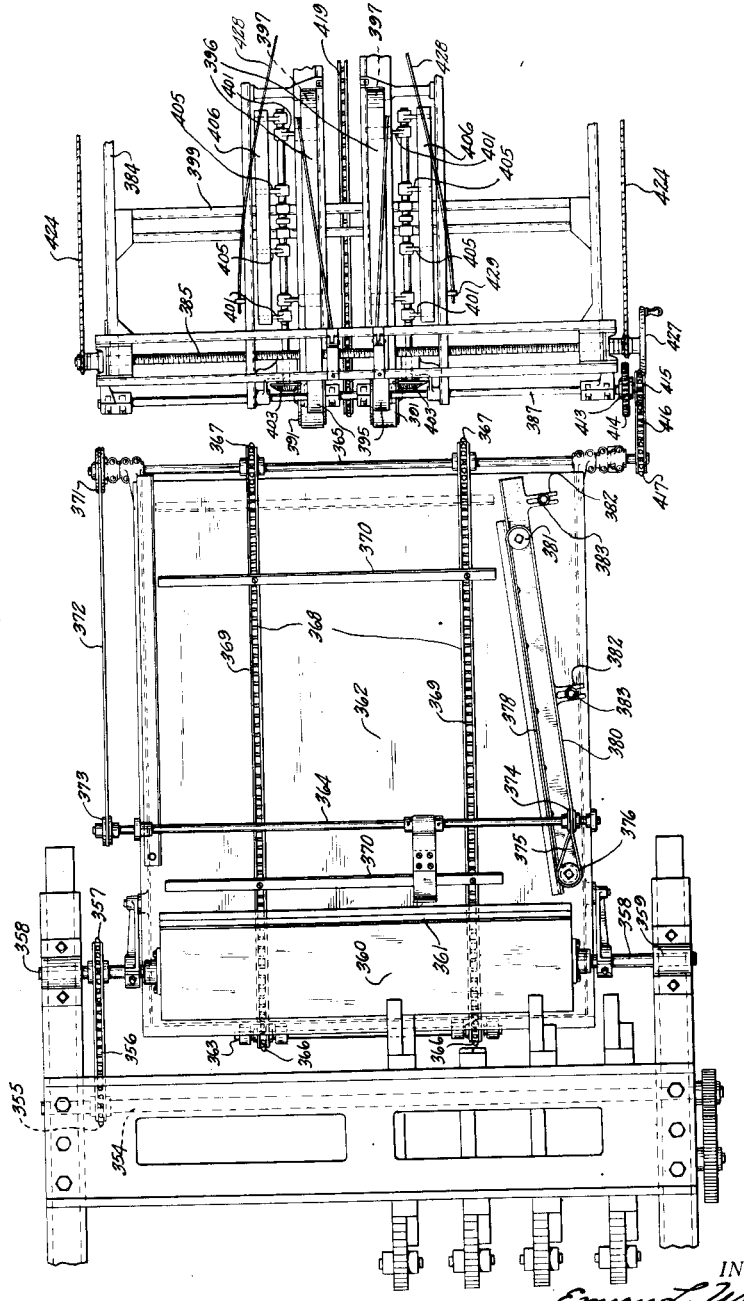

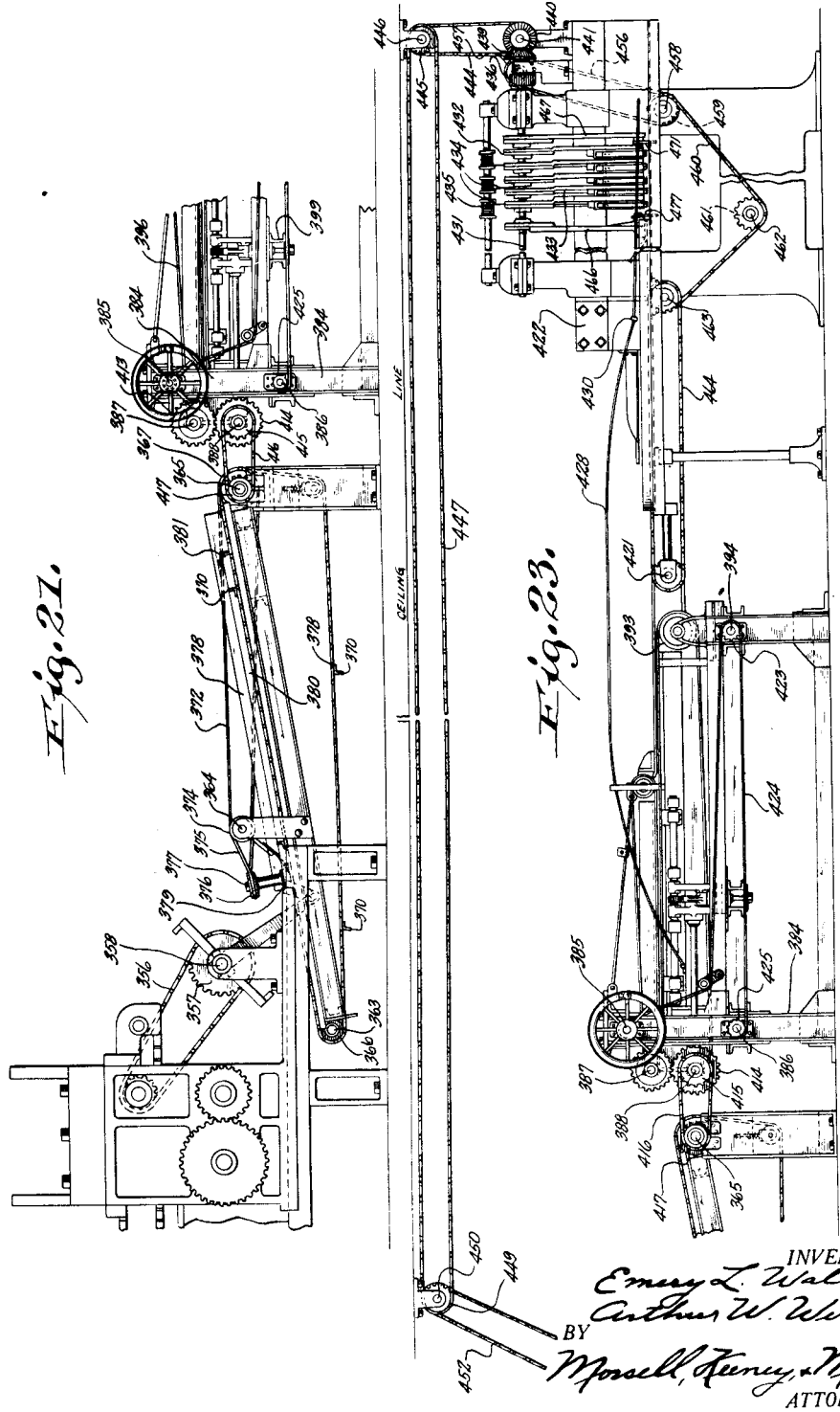

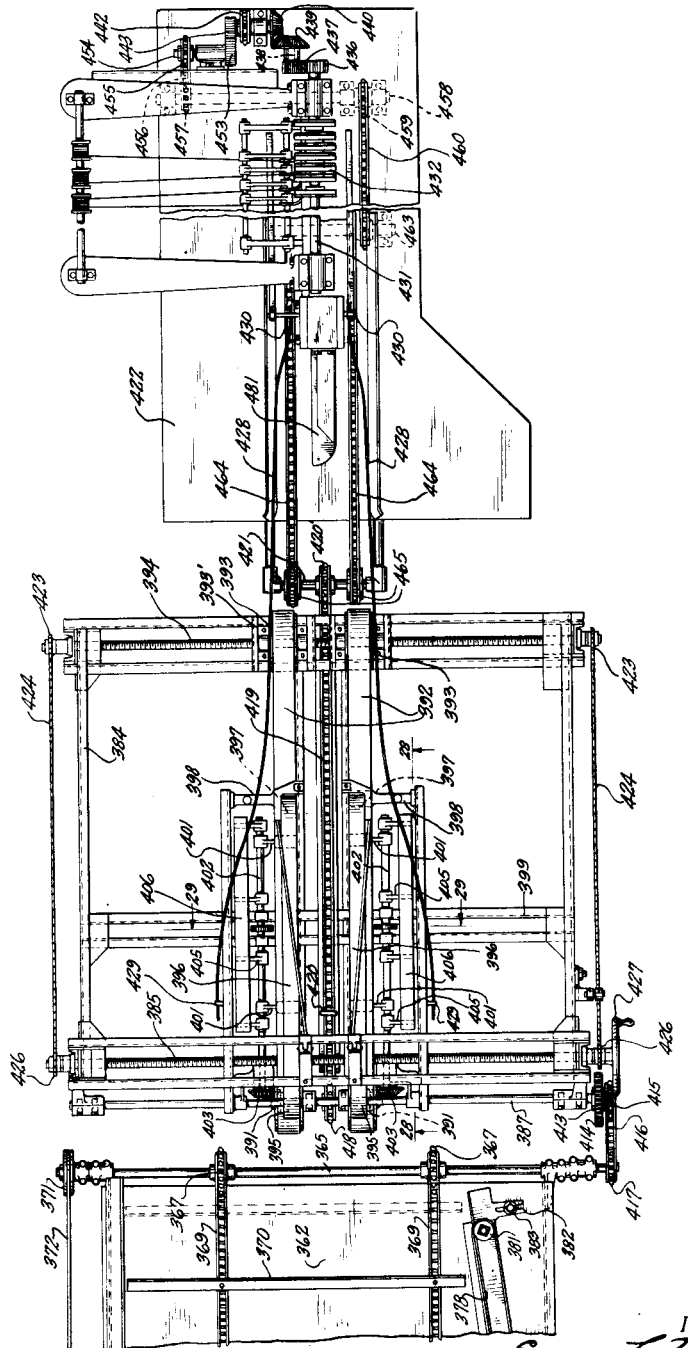

Aug. 30, 1932. E. L. WALKER ET AL 1,874,670
BOX MAKING MACHINE
Filed May 18, 1929 16 Sheets-Sheet 15
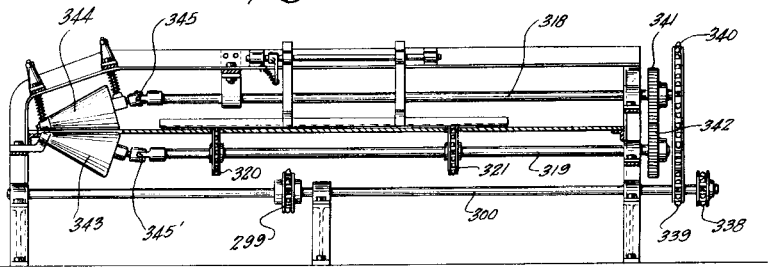
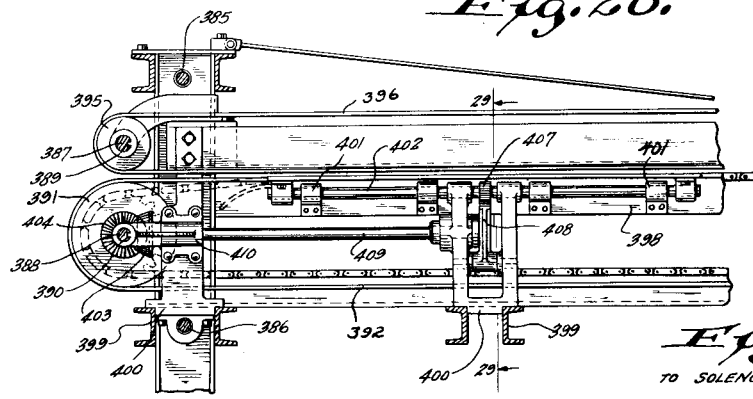
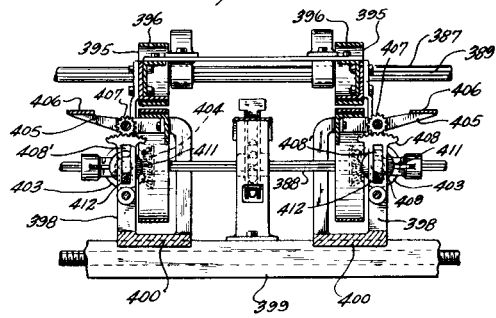
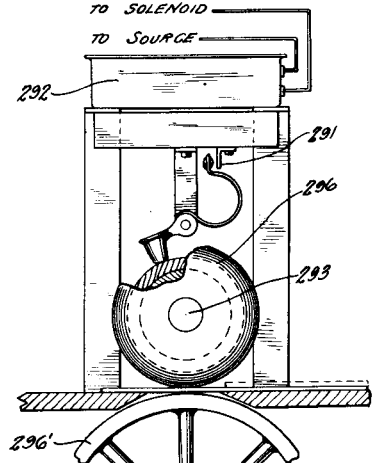
INVENTORS
Emery L. Walker
Arthur W. Werner
BY
Morsell, Kenny, & Morsell
ATTORNEYS Aug. 30, 1932.  E. L. WALKER ET AL  1,874,670
BOX MAKING MACHINE
Filed May 18, 1929   16 Sheets-Sheet 16
Fig. 32.
Fig. 33.
Fig. 34.
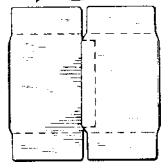
Fig. 35.
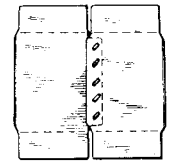
Fig. 31.
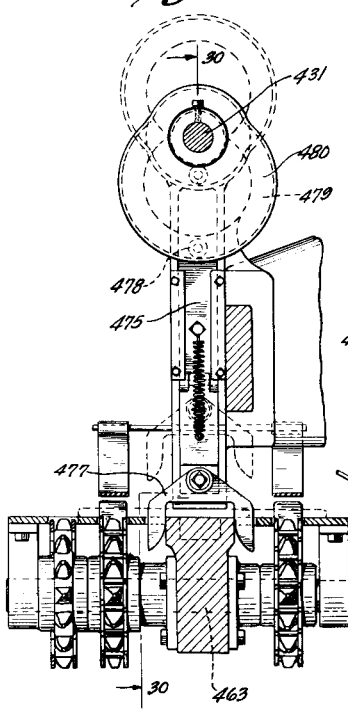
Fig. 30.
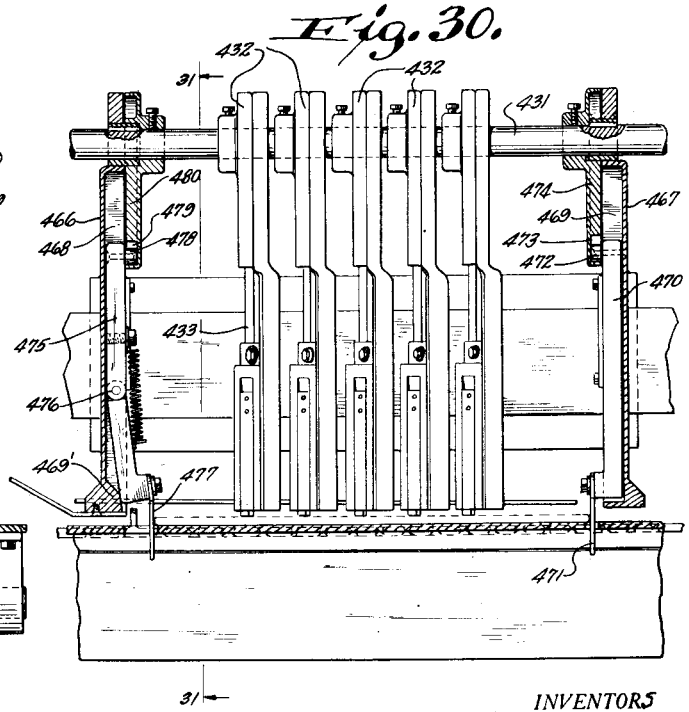
INVENTORS
Emery L. Walker
Arthur W. Werner
BY
Morsell, Henry & Morsell
ATTORNEYS.

Patented Aug. 30, 1932

1,874,670

UNITED STATES PATENT OFFICE

EMERY L. WALKER, OF WAUWATOSA, AND ARTHUR W. WERNER, OF MILWAUKEE, WISCONSIN, ASSIGNORS TO KIECKHEFER CONTAINER COMPANY, OF MILWAUKEE, WISCONSIN, A CORPORATION OF MAINE

BOX MAKING MACHINE

Application filed May 18, 1929. Serial No. 364,293.

This invention relates to improvements in box making machines, and more particularly to machines for making cartons of paper, cardboard, fiber composition, or other similar material.

Heretofore, in the making of paper boxes, each sheet of cardboard had to be put through a great number of separate operations in separate machines. Each machine required an attendant to feed the sheets and to see that they were properly operated on. Furthermore, there was a great deal of manual work connected with the making of the boxes. In view of the large number of separate operations necessary, and the number of attendants required, the manufacture of boxes was very costly and the operation was necessarily slow.

It is one of the objects of the present invention to provide a single machine by means of which a plain sheet of paper inserted in one end will emerge from the other end of the machine in the form of a completed carton in knockdown condition ready for shipment.

A further object of this invention is to provide an improved box making machine in which the slitting of the sheets, the printing of the designs, the cutting and scoring, the folding, and the stitching are completely accomplished in one continuous operation in a single machine.

It is a further object of this invention to provide a box making machine in which the feeding mechanism is perfectly timed with the separate operations of the machine, so that said operations will be performed in the proper sequence.

It is a further object of this invention to provide a box making machine which can be operated by one man, thereby accomplishing a great saving in the cost of manufacture.

A further object of this invention is to provide a box making machine which is speedy and efficient in operation and well adapted for the purpose described.

With the above and other objects in view, the invention consists of the improved box making machine and all its parts and combinations as set forth in the claims and all equivalents thereof.

In the accompanying drawings, in which the same reference characters designate the same parts in all of the views:

Figs. 1 and 2 show a plan view of the complete machine, one-half of the machine being shown in Fig. 1, and the other half of the machine being broken away and shown in Fig. 2;

Fig. 3 is a plan view of the entrance conveyer and slitting mechanism broken away from the rest of the machine;

Fig. 4 is a side elevation of the portion of the machine shown in Fig. 3;

Fig. 5 is a sectional view taken on line 5—5 of Fig. 4, parts being broken away;

Fig. 6 is a sectional view taken on line 6—6 of Fig. 4, parts being broken away;

Fig. 7 is a sectional view taken on line 7—7 of Fig. 3;

Fig. 9 is a sectional view taken on the line 9—9 of Fig. 8;

Fig. 10 is a side elevation of the portion of the machine shown in Fig. 8;

Fig. 11 is a plan view of the conveyer mechanism extending from the printer;

Fig. 12 is an enlarged sectional view taken on line 12—12 of Fig. 11;

Fig. 13 is an enlarged sectional view taken on line 13—13 of Fig. 11;

Fig. 14 is a side elevation of the portion of the device shown in Fig. 11;

Fig. 15 is a sectional view taken on line 15—15 of Fig. 11;

Fig. 16 is a plan view of the conveyer mechanism leading to the cutting and scoring mechanism;

Fig. 17 is a sectional view taken on line 17—17 of Fig. 16;

Fig. 18 is a side view of the portion of the machine embodying the cutting and scoring mechanism, showing portions of the conveyer leading thereto.

Fig. 19 is a plan view of the portion of the machine shown in Fig. 18;

Fig. 20 is a plan view of the conveyer mechanism leading from the scoring and cutting apparatus to the folding mechanism;

Fig. 21 is a side elevation of the portion of the machine shown in Fig. 20;

Fig. 22 is a plan view of the portion of the machine embodying the folding machine and the stitching machine;

Fig. 23 is a side elevation of the portion of the apparatus shown in Fig. 22;

Fig. 24 is a detail sectional view taken on line 24—24 of Fig. 3 showing the shafts, rollers, and slitting members only;

Fig. 25 is a sectional detail view taken on line 25—25 of Fig. 3;

Fig. 26 is an enlarged sectional detail view taken on line 26—26 of Fig. 11;

Fig. 27 is a transverse sectional view taken on line 27—27 of Fig. 16;

Fig. 28 is an enlarged sectional view taken on line 28—28 of Fig. 22, parts being broken away;

Fig. 29 is an enlarged sectional view taken on line 29—29 of Fig. 22;

Fig. 30 is an enlarged vertical sectional view of a portion of the stitching machine;

Fig. 31 is a sectional view taken on line 31—31 of Fig. 30;

Fig. 32 is a plan view of one of the plain sheets which is fed into the machine;

Fig. 33 is a plan view of one of the box blanks;

Fig. 34 is a plan view of one of the box blanks with opposite ends folded over; and Fig. 35 is a view of a completed knockdown container.

Figure 8:
Fig. 8 is a plan view of the cross conveyer the next portion of the machine to the entrance conveyer and slitting mechanism broken away therefrom and from the rest of the machine, and showing the printing unit and the conveyer thereto.

Referring more particularly to the drawings, the various parts of the machine will now be described in detail.

*Entrance conveyer and slitting mechanism*

Referring to Figs. 3 and 4, the entrance conveyer comprises a frame 30 having intermediate transverse members 31 and 32 and an intermediate longitudinal member 33. Positioned between the longitudinal member 33 and one of the side members of the frame is a sheet supporting portion 34 having longitudinally extending slots 35 therein and having its end portions curved downwardly as at 36 and 37. Another supporting portion 38 is spaced from the supporting portion 34 so as to form an opening 39 therebetween. The outer end of the frame is provided with a downwardly curved guiding member 40.

Journaled transversely of the frame, at the outer end thereof, is a shaft 41 carrying a rigidly mounted roller 42 within the frame, and carrying loosely mounted sprocket wheels 43 on each end. Brackets 44 extending upwardly from opposite sides of the frame are provided with slots 45 within which bearing blocks 46 are slidably mounted (see Fig. 7).

A shaft 47 journaled in said bearing blocks carries a plurality of rigidly mounted rollers 48. The bearings 46 are provided with downwardly extending arms 49 carrying rollers 50 on their lower ends. The said rollers are adapted to be engaged by cam members 51 loosely mounted on each end of the shaft 41, but secured to the sprocket wheels 43 and driven thereby. The said cams are provided with recesses 52, which when in registration with the rollers 50 allow the bearing blocks 46 to drop in the slots 45 and cause the rollers 48 on the shaft 47 to engage a sheet of material placed between said rollers and the lower roller 42. This causes said sheet to be moved rapidly into the machine ready for engagement by the conveyer. When the upper rollers 42 and bearing blocks are in the upper position shown in Fig. 7 there will be no engagement with the sheet. Thus, upon rotation of the sprocket 43 and cam 51, the shaft 47 will be moved up and down at regular intervals, gripping a sheet at the end of each downward movement, and thus timing the entrance of the sheets.

Adjustment members 53, which are adjustable in the threads of the bracket portions 54, and which engage the bearing blocks 46, carry rods 55 on their upper ends. By manipulating the nuts 56, which are threaded on the upper ends of said rods, the blocks 46 may be lowered to adjustably limit the downward pressure of the gripping rollers 48.

Journaled in the lower side of the frame is a shaft 57 carrying rigidly mounted sprocket wheels 58 on each end. The said sprockets are connected by endless chains 59 with the sprockets 43 on the shaft 41 to drive the cam 51. The shaft 57 extends through a gear reduction box 60. Another shaft 61, in said box, carries gears 62 which mesh with gears 63 on the shaft 57. Through said gears 62 and 63 and through clutches in the box, the shaft 57 may be driven at various speeds. The shaft 61 carries a sprocket wheel 64 on its outer end, the said sprocket being driven by an endless chain 65 connecting with a sprocket wheel 66 on a shaft 67 journaled in the frame.

A shaft 68 journaled between the longitudinal member 33 and the side of the frame carries rigidly mounted sprocket wheels 69 below the ends of the slots 35 in the supporting portion 34. Journaled between the sides of the frame and extending below the other end of the supporting portion 34 is a shaft 70 carrying sprocket wheels 71. Endless chains 72 connect the sprocket wheels 69 and 71 and travel in the slots 35. Pusher bars 73 secured to said chains are adapted to carry the sheets of cardboard, which are fed in by the feed rollers 48 along the conveyer. The said pusher bars are permitted to pass below the frame by means of the opening 39 at one end of the supporting portion 34 and the opening 74 at the other end.

Journaled in brackets 75 on the sides of the frame is a rod 76 carrying drag members 77 which are adapted to engage the sheets of cardboard to hold them flat on the conveyer. An arm 78 extending downwardly from one end of the rod is connected by a spring 79 with the frame (see Fig. 4). The said spring tends to yieldingly hold the drag members in engaging position.

The entire frame 30 is pivotally connected at its inner end, as at 80, to the frame 81 of the sheet slitting apparatus. The sheets are guided into said frame by a flat section of material 82 having a downwardly curved end 83, on the conveyer frame 30. The sheets are moved through the slitting apparatus by means of upper and lower belts 84 and 84' respectively, connecting upon rollers 85 and 86 and lower rollers 85' and 86', the upper rollers being mounted on shafts 87 and 88 respectively, and the lower rollers being mounted on shafts 87' and 88'. Upper and lower shafts 89 and 89' are provided with rotatable knives 90 and 90' respectively, which are adapted to engage the sheet of cardboard, passing between the belts to slit said sheet into a plurality of sections, each of the proper size for forming a carton, see Fig. 24.

On an outer end of the shaft 89', is a large pulley 91 which is driven by an endless belt 92 connected with a pulley 93 on a motor 94. Also mounted on said shaft 89' is a smaller pulley 95 and a gear 96. The gear 96 meshes with a gear 97 on the shaft 89 to drive said shaft. The gear 96 also meshes with idler gears 98 and 99 which drive gears 100 and 101 rigidly mounted on the shafts 87' and 88'. The latter gears in turn mesh with gears 102 and 103 rigidly mounted on the shafts 87 and 88. Thus through the pulley 91 on the shaft 89', the cutting members 90 and the feed belts 84 are driven.

On the other end of the shaft 87 is a pulley 104 which is connected by an endless belt 105 with a pulley 106 on the end of a shaft 107 journaled transversely of the frame 30. Said shaft 107 also carries on opposite ends pulleys 108 and 109. The pulley 108 is connected by an endless belt 110 with a pulley 111 on the end of the lower roller shaft 41 to drive the same. The pulley 109 is connected by a crossed endless belt 112 with a pulley 113 on the end of the upper roller shaft 47 to drive the same. Thus the motor 94, through the transmission means above described drives the slitting mechanism and the feed rollers 42 and 48.

Journaled in brackets 114, below the slitting apparatus, is a shaft 115. The said shaft carries a rigidly mounted sprocket wheel 116 on one end and a rigidly mounted sprocket wheel 117 on its other end. The sprocket 117 is connected by an endless chain 118 with a sprocket 119 rigidly mounted on a short shaft 120. Also rigidly mounted on the shaft 120 is a sprocket 121 which is connected by an endless chain 122 with a sprocket 123 rigidly mounted on the end of the shaft 70. Also rigidly mounted on the shaft 70 is a sprocket wheel 124 which is connected by an endless chain 125 with a sprocket 126 rigidly mounted on an end of the shaft 67. Thus, through the sprocket 116 on the shaft 115, below the slitting apparatus, and through the transmission means above described, the endless conveyer chains 72 are driven, and also the timing mechanism for the up and down movement of the feed rollers 48.

Brackets 127 and 128, mounted on the side of the frame 30 carry arms 129 and 130. Extending at right angles from the arms 129 and 130 are arms 131 and 132 carrying loosely mounted crowder rollers 133 and 134 which extend into recesses 135 and 136 in the supporting portion 34. Positioned below the rollers 133 and 134 are similar rollers 135' and 136' mounted rigidly on shafts 137 and 138. Said shafts carry rigidly mounted sprocket wheels 139 and 140 which are connected by an endless chain 141. The shaft 138 carries an additional sprocket wheel 142 which is connected by an endless chain 143 with a sprocket 144 on the shaft 70, by which means the crowder mechanism is driven. When a sheet passes between the rollers 133 and 135', it is engaged by the rotating rollers, and, because said rollers are set at an angle, the sheet is "crowded" over toward the side of the frame until its side edge is flush therewith. Thus, the sheet is properly alined, so that when it enters the slitting apparatus, it will be cut along the proper lines, see Fig. 25.

*Vertical adjustment for entrance conveyer frame*

The small pulley 95, on the shaft 89', is connected by an endless belt 145 with a pulley 146 rigidly mounted on a shaft 147 (see Figs. 4 and 6). The said shaft is journaled in brackets 148 depending from the ceiling 149. A pulley 150 is also rigidly mounted on the shaft 147.

A bearing 151 and a housing 152 are also suspended from the ceiling. A shaft 153 has one end journaled in the bearing 151 and has its other end journaled in the housing 152, the said end being provided with a worm gear within the housing. The said worm gear meshes with a worm 154 mounted rigidly on a shaft 155 (see Fig. 5). The latter shaft is journaled in the housing 152 and in a depending bracket 156. Mounted on said shaft is a rigid pulley 157 and loose pulleys 158 and 159 on each side thereof. A crossed belt 160 connects the pulley 158 with the shaft 147, and a belt 161 connects the pulley 159 with the pulley 150 on the shaft 147.

Mounted in the housing 152 and in brackets 162 and 162' is a slidable rod 163 having belt shifters 164 and 165 extending therefrom and engaging the belts 160 and 161 respectively. The ends of the rod 163 have cables 166 connected thereto, the said cables passing over pulleys 167 and 168 and terminating in portions 169 which are adapted to be pulled by the operator to cause a shifting of the belts 160 and 161.

A drum 170 is rigidly secured to the shaft 153, and said drum has cables 171 windable thereon. The said cables pass over pulleys 172 and have their ends connected to opposite sides of the conveyer frame as at 173.

In operation the belts 160 and 161 are normally on the loose pulleys 158 and 159, and consequently there is no rotation of the shaft 155. When, however, there is a pull upon the end 169 of one of the cables 166, the rod 163 is moved and the belt shifters move the belts 160 and 161 and cause one of them to engage the drive pulley 157. This causes rotation of the shaft 155, and through the worm 154, rotation of the shaft 153. This causes the cables 171 to be wound on the drum to raise the end of the conveyer frame 30, which is pivoted at its other end, so that the free end is flush with the top of the stack of sheets of cardboard 174 which are to be fed into the machine. By pulling on the end of the other cable 166, the conveyer frame may be lowered in a similar manner, due to the fact that the belt 160 is crossed, thereby reversing the direction of rotation of the shafts and drum 170.

*Conveyer from slitting apparatus and conveyer to printer*

Positioned adjacent the slitting apparatus and extending at right angles thereto is a frame 174 having an extending portion 175 overhanging therefrom (see Figs. 8, 9 and 10). Bearings 176, at one end of the frame, have a shaft 177 carrying a rigidly mounted roller 178, journaled therein. At the other end of the frame, on the supporting portion 175 are bearings 179 within which a shaft 180, carrying a roller 181, is journaled. An endless belt 182 connects the rollers 178 and 181. Brackets 183, extending from the frame of the slitting apparatus are connected by a cross-piece 184, from which a plurality of drag members 185 extend to the conveyer belt 182. The said drags are adapted to engage the sheets to hold them flat on the belt.

Rigidly mounted on an end of the shaft 177 is a pulley 186 which is connected by an endless belt 187 with a pulled 188 mounted on a shaft 189 extending from a variable speed reducer 190. Another shaft 191 extending from the speed reducer carries a pulley 192 which is connected by a belt 193 with a pulley 194 mounted on a shaft 195, the latter being journaled in bearings 196. Another larger pulley 197, on the shaft 195, is connected by a belt 198 with a pulley 199 on a driving motor 200.

On the extending portion 175 are spaced apart bearings 201 within which shafts 202 and 203 carrying high speed rollers 204 and 205 are journaled. The said shafts are also provided with meshing gears 206 and 207. On the shaft 203 is a sprocket wheel 208 which is connected by an endless chain 209 with a sprocket 210 on a motor 211. When the sheets of cardboard, which have been cut by the slitting apparatus are deposited on the belt 182, they are carried slowly by said belt toward the high speed rollers 204 and 205. As soon as one of these sheets engages between the latter rollers, it is thrown rapidly onto the printing press table 175'. Here it is engaged by the "sheet kicker" 212 and moved into the printing press. By the time the "kicker" returns to its rearward position, the next sheet has been thrown onto the supporting portion by the high speed rollers and is ready to be engaged by the "kicker." Thus, the high speed rollers, when rotated at the proper speed, time the entrance of the sheets to the printing press table 175' so as to occur when the kicker has reached its rearward position. Due to the fact that said rollers are moving at a much higher speed than the belt 182, and due to the fact that the "kicker" moves rapidly, each sheet is moved off of the printing press table 175' before the next sheet arrives, and thus there is no "bunching up" of the sheets prior to their entrance to the printing press 213.

The printing press table 175' is connected with the frame of a printing press 213, the said press being adapted to print the designs on the flat sheets of cardboard and employing rapidly drying ink so that the sheets will not be smeared during the subsequent operations. Journaled in the lower portion of the frame 213 of the printing press is a shaft 214 carrying a rigidly mounted sprocket wheel 215 and a gear 216. The sprocket wheel 215 is connected by an endless chain 217 with a sprocket 218 on a shaft 219. Another sprocket wheel 220 is also carried by the shaft 219, and said sprocket is connected by a chain 221 with a sprocket wheel 222 on the shaft 115 below the slitting apparatus.

The gear 216 meshes with gears 223 and 224 on the printing machine, the latter being mounted on a shaft 225. On the other end of said shaft 225 is a pair of loosely mounted sprocket wheels 226 and 227 (see Fig. 11) with a clutch 228 therebetween which is adapted to selectively engage one of said sprocket wheels.

The "sheet kicker" 212 is secured to a plate 229. An arm 230 below the printing press table 175', has a curved end 231 extending through a longitudinal slot 232 in the printer table and connected to the lower side of the plate 229. The other end of the arm 230 is connected to one end of an arm 233, the latter having its other end rigidly secured to a rod 234 journaled below the frame. An outer end of the rod 234 has another arm 235 extending therefrom, the said arm being connected to one end of a rod 236. The other end of the rod 236 has an eccentric connection with one of the gears of the printer, so that a reciprocating movement is imparted thereto, and through the shaft 234, arm 233, and rod 236, said movement is transmitted to the "kicker" 212, to cause the latter to move back and forth in the slot 232 for the purpose of feeding sheets to the printing machine.

When the end of the conveyer frame 174 is positioned as in Fig. 8, single sheets only can be fed to the printer. However, if said end is moved so that it coincides with the side of the printer, double sheets can be fed to the latter. When such is the case, the rotatable cutting member 236', mounted on a shaft 237, in the printing frame, is employed to cut the double sheets in two.

A rod 238, at the outer end of the printing frame carries arms 239 which are provided with rollers 240. Weights 241, on said arms, hold said rollers in contact with the sheets as they are fed from the printer to the conveyer frame 242.

*Conveyer leading from printing machine*

Journaled in the end of the conveyer frame 242 adjacent the printer is a shaft 243 carrying rigidly mounted rollers 244. Another shaft 245 carries rigidly mounted rollers 246 which project through openings 247 in the top portion 248 of the frame (see Figs. 11, 14 and 15). Endless belts 248' for conveying the sheets, connect said rollers. Also rigidly mounted on the shaft 243 are sprocket wheels 249 and 250. The sprocket wheel 249 is connected by an endless chain 249' with a sprocket 251 mounted on a shaft 252 below the frame. The said chain carries sheet engaging lugs 253 which move in a slot 254 in the top portion 248 of the frame.

The sprocket wheel 250 is connected by an endless chain 255 which moves in a slot 256, with a sprocket 257 on a shaft 258 (see Fig. 16). The said chain also carries lugs 259.

If one sheet only is discharged from the printing press, it is taken care of by the lugs 259, on the chain 255, and is moved along the conveyer thereby, the chain 249' not being utilized. However, if a double sheet has been fed to the printer, and after having been cut by the slitter 236', comes out in two sections, the other section is conveyed by the lugs 253 on the chain 249'.

Journaled transversely below an intermediate portion of the conveyer frame is a shaft 260 having sprocket wheels 261 and 262 rigidly mounted thereon. The latter are connected by endless chains 263 and 264 with the sprocket wheels 226 and 227 respectively on the printer. As the sprockets 261 and 262 are of different sizes, the shaft 225 on the printer may be driven at two different speeds, according to which of the sprockets 226 and 227 is engaged by the clutch 228.

The shaft 260 also carries a rigidly mounted bevel gear 265 which meshes with a bevel gear 266 on a shaft 267 journaled below the frame. The shaft 267 carries three rigidly mounted sprocket wheels 268. Mounted on a shaft 269 above the shaft 267 are three other sprocket wheels 270. Other shafts 271, 272 and 273, journaled as shown in Fig. 12, each carry sets of sprocket wheels 274, 275 and 276, respectively. Chains 277 connect each set of sprocket wheels as shown, and said chains have sheet engaging lugs 278 extending from their sides, the said lugs being adapted to travel in slots 279 in the top frame portion 248, and to rest upon guiding plates 280, as shown in Fig. 12.

When double sheets come out of the printer, the sheets carried by the chains 249' are moved to the portion of the frame having the slots 279, within which the lugs 278 are travelling. Here the sheets are engaged by said lugs, and are moved in a direction at right angles to their former direction of travel, between the sheets being carried by the chain 255. Thus, the sheets which come out of the printer in pairs, are operated on by the chains 277 so that they travel in single file.

It is to be noted that the conveyer leading from the printing machine to the blank forming and scoring mechanism is of substantial length. This provides a sufficient time interval to elapse in the progress of the sheets so that the sheets will be entirely dry before they are operated on by the blank forming mechanism. This drying is further brought about by the use of a rapidly drying ink in connection with the printing press as before mentioned.

Brackets 281 on opposite sides of the frame have a rod 282 journaled therein which carries rigid arms 283 (see Figs. 14 and 15). Pull rollers 284 are also journaled between the brackets 281 and said rollers are driven by an endless chain 285 connected with a sprocket 286 on a shaft 260. A platform 288 extends from the brackets, parallel to the frame but spaced thereabove.

Extending from an end of the rod 282 is an arm 289 having a piston extending downwardly therefrom, and pivoted thereto. The said piston enters the core of a solenoid 290 which is wired to a conduit box 292 (see Figs. 11, 14 and 26). The said conduit box is positioned above a shaft 293, the latter being journaled in a bearing 293'. One end of said shaft carries a gear 294 which meshes with a gear 294' on a shaft 295. The latter shaft has a sprocket wheel 295' which is driven by the endless chain 264. The other end of the shaft 293 carries a roller 296 below which is a roller wheel 296' rigidly mounted on the shaft 295. The two rollers are normally held sufficiently far apart to permit a single thickness of cardboard to pass therebetween. If, through some accident, two sheets pass between the rollers, the roller 296 will be raised up to close a switch 291 below the conduit box 292. This will cause the solenoid 290 to be energized, thereby pulling down on the arm 289 causing the shaft 282 to be turned, and the arms 283 to be moved downwardly so that their end portions engage the top of the frame. The sheets of cardboard, instead of being permitted to travel in their normal course, will pass over the arms 283, between the rollers 284 and will be shunted onto the emergency platform 288.

The shaft 260 is also provided with a rigidly mounted sprocket wheel 297 which is connected by an endless chain 298 with a sprocket wheel 299 on a transversely journaled shaft 300 (see Figs. 16, 17 and 27). The shaft 287 is also provided with a rigidly mounted sprocket wheel 301 and with a gear 301' meshing with a gear 301" on the shaft 260. The sprocket 301 is connected by an endless chain 302 with a sprocket wheel 303 on the shaft 258. The shaft 258 has its outer end provided with a sprocket wheel 304 which is connected to a sprocket wheel 305 on a shaft 306 by an endless chain 307. The shaft 306 carries a rigidly mounted roller 308 which extends through an opening 309 in the top portion of the frame. Another roller 310 is mounted on a shaft 311, and projects through an opening 312 in the top portion. An endless conveyer belt 313 connects said rollers and has its upper portion extending above the top of the frame.

The sheets of cardboard are normally carried by the endless chain 255 below the arms 283, between a guide member 314 and the side of the frame, to the endless belt 313. The latter then carries the sheets the remaining length of the conveyer frame at a higher speed than they were formerly carried by the chain 255.

*Conveyer to blank forming and scoring mechanism*

The top portion of the conveyer frame 248 is widened as at 315 to connect with an upwardly inclined platform 316 mounted on a frame 317. Journaled at the end of said upwardly inclined platform above the shaft 300 are shafts 318 and 319. The shaft 319 loosely mounted sprocket wheels 320 and 321 which are connected by endless chains 322 and 323 with sprocket wheels 324 and 325 rigidly mounted on a shaft 326. The said chains pass in slots 327 in the platform 316, and carry pusher bars 328 for conveying the sheets.

Sprocket wheels 329 and 330, also rigidly mounted on the shaft 326, are connected by endless chains 331 and 332 with sprocket wheels 333 and 334 mounted on a shaft 335. The chains 331 and 332 also ride in slots 336 and carry pusher bars 337.

The shaft 300 carries sprocket wheels 338 and 339 (see Fig. 27). The sprocket 339 is connected by an endless chain with a sprocket wheel 340 on the shaft 318. The latter shaft also carries a gear 341 which meshes with a gear 342 on the shaft 319 to drive the latter. The shaft 319 carries a rigidly mounted cone roller 343 and the shaft 318 carries a similar cone roller 344 (see Fig. 27). The latter shafts are provided with universal joints 345 and 345' to permit said cones to engage one another on a line parallel with the top of the conveyer.

When the sheets of cardboard, which are travelling lengthwise along the belt 313 are engaged between the cone rollers, they are turned at right angles, due to the shape of said rollers. This causes them to be thrown onto the platform 316 with their long sides approaching the blank forming and scoring machine 346.

The sheets which are thrown onto the platform 316 are then engaged by drag members 343' which retard their movement, and the sheets are then engaged by the pusher bars 328 and 337 and conveyed upwardly on the inclined platform. A "crowder" roller 344', similar to those employed on the entrance conveyer, then engages the sheets to aline them with the side of the platform so that they will be accurately positioned for entrance into the blank cutting and scoring device. Drag brushes 345' also engage the sheets to hold them flat on the platform.

*Blank forming and scoring machine*

This machine, which is a standard product, will only be referred to briefly. The plain sheets, which enter the device are cut in the proper places to form flaps, and are also scored on the proper lines to permit folding. When said sheets are discharged from the machine, they are in the form of box blanks shown in Fig. 33.

The drive shaft 347 of the blank forming and scoring machine is provided with rigidly mounted sprocket wheels 348 and 349 and with a pulley 350. The pulley is connected by an endless belt 351 with a pulley 352 on the shaft of the main motor 352'. The sprocket wheel 348 is connected by an endless chain 353, with the sprocket 338 on the shaft 300.

Another shaft 354, in the blank cutting and scoring machine is provided with a rigidly mounted sprocket wheel 355 which is connected by an endless chain 356 with a sprocket wheel 357 on a shaft 358. The latter shaft is journaled in bearing brackets 359, and carries a sheet turner 360. The latter is provided with shoulders 361. When a sheet is discharged from the cutting and creasing machine, it falls upon the sheet turner 360 which is rotating. The latter deposits the sheet on the conveyer 362 so that the reverse side is facing upwardly.

The conveyer 362 has transversely journaled shafts 363, 364 and 365. Sprocket wheels 366 and 367 on said shafts 363 and 365 respectively are connected by endless chains 368. The latter travel in slots 369 in the platform 362, and carry pusher bars 370 for moving the sheets.

A pulley 371, rigidly mounted on the shaft 365 is connected by an endless belt 372 with a pulley 373, rigidly mounted on the shaft 364. Near the other end of the shaft 364 is a pulley 374 which is connected by a belt 375, the latter being connected with a pulley 376 on a shaft 377. The latter shaft extends upwardly from a gauge member 378. A pulley 379 on the lower end of the shaft 377 extends through a slot in the side of the gauge member, and is connected by an endless belt 380 with a similar pulley 381 at the other end of the gauge member. The said gauge member is provided with slotted extensions 382 for adjustable engagement with bolts 383 to vary the position of the gauge member.

The folding mechanism

The frame 384 of the folding device is provided at one end with transversely journaled screws 385 and 386, each having one half threaded in one direction and the other half threaded in the opposite direction. Shafts 387 and 388, having longitudinal grooves 389 and 390 are also journaled in said end of the frame. Pulleys 391, having keys which fit within the grooves 390 on the shaft 388 are slidably positioned on said shaft. The said pulleys are connected by endless belts 392 with pulleys 393 which are positioned within members 393′, the latter being in threaded engagement with a screw 394 at the other end of the frame, the said screw also having oppositely threaded portions. Pulleys 395 are slidably positioned on the upper shaft 387 and are connected by endless belts 396 with pulleys 397 (see Figs. 22, 23, 28 and 29).

The pulleys 397 are rotatably mounted in frames 398 which are laterally slidable in guideways 399 as at 400 (see Fig. 28). Brackets 401 extending from the slidable frames have rods 402 journaled therein which carry rigidly mounted arms 405, the latter extending therefrom. The said arms carry folding members 406 (see Fig. 29). The rods 402 are also provided with rigidly mounted gears 407 the latter being engaged by rack members 408. The rack members have their lower ends pivoted to the slidable frame portions 398 and are formed with slots 408′.

Shafts 409 are journaled in the slidable frame portions 398 and in bearings 410. The outer ends of said shafts carry rigidly mounted bevel gears 403 which are driven by bevel gears 404 on the shaft 388. The inner ends of said shafts carry rigidly mounted circular members 411 which have blocks 412 pivoted to an eccentric portion thereof, the said blocks being slidable in the slots 408′ of the rack members 408.

Upon rotation of the shafts 409 by the bevel gears 403 and 404, the circular members 411 are rotated, and through the eccentric blocks 412 the rack members are reciprocally moved. By means of the gears 407 engaging said rack members, the folding members 406 are moved up and down at regular intervals to fold over the ends of the box blanks as said blanks are passing between the belts 392 and 396.

The shafts 387 and 388 are provided at one end with intermeshing gears 413 and 414. The shaft 388 is further provided with a sprocket wheel 415 which is connected by an endless chain 416 with a sprocket 417 on the shaft 365 of the conveyer frame 362. A sprocket wheel 418, rigidly mounted on a central portion of the shaft 388 is connected by an endless chain 419 having lugs 420 with a sprocket 420′ rigidly mounted on a shaft 421 at one end of the stitcher frame 422.

Sprocket wheels 423, on each end of the screw 394 are connected by endless chains 424 with sprocket wheels 425 on each end of the screw 386 and with sprocket wheels 426 on each end of the screw 385. The screw 385 is further provided with a hand wheel 427. Upon rotation of the latter the screws 385, 386 and 394 are turned, and due to the oppositely threaded portions thereon, the frames 398 and the pulleys and belts connected therewith are moved farther apart or closer together to adjust the space between the folding members 406 to the width of the box blank which is to be folded.

Converging guide bars 428 have one end secured to the folding device as at 429 and have their other ends secured to the stitching device as at 430. As the box blanks pass through the folding device and into the stitcher beneath said bars, the ends which have been folded upwardly by the folding members 406 are gradually folded down completely by said guide bars.

The stitcher

The stitcher 422 (see Figs. 22, 23, 30 and 31), is for the most part a standard product, and will therefore be described briefly. A shaft 431 journaled in the frame, carries a plurality of cam members 432 which have a plurality of stitching arms 433 operable thereby. The said stitching arms are fed with wire 434 from spools 435 and are adapted to secure the folded over ends of the box blanks together by means of said wire.

The shaft 431 is provided on its outer end with a rigidly mounted gear 436 which meshes with a gear 437 on a short shaft 438. The said shaft 438 also carries a bevel gear 439 which meshes with a bevel gear 440 on a shaft 441. The shaft 441 carries a sprocket wheel 442 and a gear 443. The sprocket 442 is connected by an endless chain 444 with a sprocket 445 on a shaft 446 journaled in bearings depending from the ceiling. The shaft 446, through an endless chain 447 engaging another sprocket wheel 448 mounted on the shaft 446, is connected with a sprocket 449 on a shaft 450. Another sprocket 451 on the shaft 450 is connected by an endless chain 452 with the sprocket 349 on the shaft 347 of the blank forming machine.

A gear 443 on the shaft 441 meshes with a gear 453 on a shaft 454. A sprocket wheel 455, also on the shaft 454, is connected by an endless chain 456 with a sprocket 457 on a shaft 458 below the stitcher. Another sprocket 459 on the shaft 458 is connected by an endless chain 460 with a sprocket 461 on a shaft 462, and with a sprocket on the shaft 463. Other sprocket wheels on the shaft 463 are connected by endless chains 464 with sprocket wheels 465 on the shaft 421.

A novel feature of the stitching machine resides in the means which is employed for holding the folded box blank in squared position while the stitching is being done, so that the completed box will be true in shape. This feature is illustrated in detail in Figs. 30 and 31. Referring to said figures, the downwardly extending portions 466 and 467 of the bearings in which the shaft 431 is journaled are formed with slots 468 and 469. Slidably mounted in the slot 469 is a bar 470 carrying a plate 471 on its lower end. The upper end of said bar has a pin 472 extending therefrom which engages a slot 473 in a cam member 474. The said cam is rigidly mounted on the shaft 431.

Slidable in the slot 468 is a bar 475 which is formed of upper and lower sections pivoted together as at 476. The lower section carries a plate 477 similar to the plate 471 on the bar 470, and the upper section carries a pin 478. The said pin is received in a slot 479 of a cam member 480, the latter being also rotatable with the shaft 431. The slot 468 is formed on its lower portion with an inclined surface 469' which forces the lower portion of the bar 475 outwardly.

When a box blank guided by the bars 428 and by a guide 481 enters beneath the stitching arms 433, the cams, bars and plates 471 and 477 are in the positions shown by the dotted lines in Fig. 31. When the blank is directly below the stitching arms, the cam members 474 and 480 are turned to the position shown by full lines in Fig. 31. Through the pins 472 and 478 the bars 470 and 475 are forced downwardly and the plates 471 and 477 grip the blank therebetween. Through the inclined surface 469, the plate 477 is forced inwardly, squaring the box blank, and holding it in squared position until the overlapping edges are stitched. The plates 471 and 477 are then raised upwardly again and the blank is discharged from the end of the stitcher in completed knockdown form.

*Summary of operation of the machine*

In manufacturing paper boxes with the machine, a stack of sheets of cardboard, fiberboard or other similar material, one of said sheets being illustrated in Fig. 32, is placed near the end of the entrance conveyer 30 as at 174 (Fig. 4). Next, one of the cables 166 is operated to cause a rotation of the drum 170, as previously described in detail, to vertically aline the end of the entrance conveyer frame with the top of the stack of sheets. The operator then feeds the sheets one at a time to the feed rollers 42 and 48. As the upper rollers 48 are moved up and down by the timing mechanism, the sheets are thrown thereby onto the conveyer where they are engaged by the pusher bars 73. The angularly positioned "crowder" rollers 133 and 134 then force the sheets against the side of the frame so that they are in proper alinement with the slitting device. This is an important feature, inasmuch as the sheets must be cut along the proper lines by the slitter.

When the sheets reach the end of the entrance conveyer, they are engaged by the belts 84 and 84' of the slitter and are carried between the rotatable knives 90 and 90' where they are cut into a plurality of sections. Each of said sections may be of a size to form either one or two cartons.

The several sections, into which the sheet has been cut, are then discharged onto the conveyer belt 182 and are carried to the high speed rollers 204 and 205. The said rollers deposit the sheets, one at a time on the printing press table 175', where each sheet is engaged by the "kicker" 212 and moved into the printer, before the next sheet has been deposited upon the printing table. The printer then prints the designs on the sheets with a rapidly drying ink, the said ink being practically dry when the sheets are discharged.

Next, the sheets are conveyed by the belts 248' and the chains 249' and 255 along the conveyer platform 248. If a double row of sheets has been discharged from the printer, the sheets are formed into a single file by means of the chains 277. If, through some accident, there is a double thickness of sheets, through the operation of the safety roller 296 and switch 291, as before described, the arms 283 will be pulled downwardly and the sheets will be shunted onto the emergency platform 288.

If, however, the sheets are traveling properly, they will be carried beneath the arms 283 and along the conveyer to the cone rollers 343 and 344. The latter will turn the sheets at right angles to their former position ready to be fed into the blank forming and scoring apparatus 346. From the latter machine the sheets are discharged in the form of blanks shown in Fig. 33, scored and cut along the proper lines. The sheets are there engaged by the sheet turner 360 and deposited on the conveyer portion 362 with their reverse sides up. The sheets are next carried along the conveyer platform 362 by the pusher bars 370 and the outer edge of each of the sheets is engaged by the moving belt 380 extending through the sides of the gauge bar. The latter member properly guides the sheets into the folding apparatus.

The folding members 406 of the folding machine engage the opposite ends of the blank to fold them over to the position shown in Fig. 34. From the folding machine, the partially completed cartons enter the stitcher 422 where they are engaged by plates 471 and 477 and squared while the meeting edges are stitched together, the completed container being discharged in the knockdown form shown in Fig. 35, ready for shipment to the consumer.

In Figs. 1 and 2, the complete layout of the box making machine is shown, and upon examination it may be seen that all of the units are interconnected by the various driving chains, belts, and gears, so that the operations of all of the units are perfectly timed with respect to one another. This timing feature is essential to successful operation of a machine of this type.

From the above description, it may be seen that a unitary box making machine has been provided which is adapted to receive plain, uncut sheets of cardboard and to so operate on said sheets, without the intervention of human hands, that said sheets are discharged in the form of completed knockdown cartons. The term "plain, uncut sheets of material" as used in the claims contemplate sheets which are either untrimmed or sheets which are to be subdivided into a plurality of sections, or both.

Although only one form of the invention has been shown and described, it is obvious that various modifications may be made without departing from the spirit of the invention, and it is to be understood that all of such modifications are contemplated as may fairly come within the scope of the claims.

What we claim is:

1. As a unitary construction, a machine for forming knockdown boxes from plain, uncut sheets of material, comprising means for conveying said sheets of material through the machine, means for cutting said sheets to a desired size while passing through the machine, means for cutting box blanks from each of said cut sheets, and means for forming said blanks into knockdown box formation.

2. As a unitary construction, a machine for forming knockdown boxes from plain, uncut sheets of material, comprising means for conveying said sheets of material through the machine, means for cutting said sheets to a desired size while passing through the machine, means for cutting box blanks from each of said cut sheets, means for folding the free ends of said blanks into knockdown box formation, and means for securing the free ends of the blanks together.

3. As a unitary construction, a machine for forming a plurality of knockdown boxes from a single sheet of plain, uncut material, comprising means for conveying said sheet of material, means for slitting said sheet into a plurality of units each of the proper size for forming a box, means for cutting box blanks from each of said units, and means for forming each of said blanks into knockdown box formation.

4. As a unitary construction, a machine for forming a plurality of knockdown boxes from a single sheet of plain, uncut material, comprising means for conveying said sheet of material, means for slitting said sheet into a plurality of units each of the proper size for forming a box, means for cutting box blanks from each of said units, means for folding the free ends of each of said blanks into knockdown box formation, and means for securing the free ends of the blanks together.

5. As a unitary construction, a machine for forming knockdown boxes from plain, uncut sheets of material, comprising means for conveying said sheets of material through the machine, means for cutting said sheets to a desired size while passing through the machine, means for cutting box blanks from each of said cut sheets, means for forming said blanks into knockdown box formation, and interrelated driving mechanism for said conveying means and said other means for timing the travel of said sheets with relation to the operations of said other means.

6. As a unitary construction, a machine for forming knockdown boxes from plain, uncut sheets of material, comprising means for conveying said sheets of material through the machine, means for cutting said sheets to a desired size while passing through the machine, means for cutting box blanks from each of said cut sheets, means for folding the free ends of said blanks into knockdown box formation, means for securing the free ends of the blanks together, and interrelated driving mechanism for said conveying means and said other means for timing the travel of said sheets with relation to the operations of said other means.

7. As a unitary construction, a machine for forming a plurality of knockdown boxes from a single sheet of plain, uncut material, comprising means for conveying said sheet of material, means for slitting said sheet into a plurality of units each of the proper size for forming a box, means for cutting box blanks from each of said units, means for forming each of said blanks into knockdown box formation, and interrelated driving mechanism for said conveying means and said other means for timing the travel of said sheets with relation to the operations of said other means.

8. As a unitary construction, a machine for forming a plurality of knockdown boxes from a single sheet of plain, uncut material, comprising means for conveying said sheet of material, means for slitting said sheet into a plurality of units each of the proper size for forming a box, means for cutting box blanks from each of said units, means for folding the free ends of each of said blanks into knockdown box formation, means for securing the free ends of the blanks together, and interrelated driving mechanism for said conveying means and said other means for timing the travel of said sheets with relation to the operations of said other means.

9. As a unitary construction, a machine for forming knockdown boxes from plain, uncut sheets of material, comprising an entrance conveyer, slitting mechanism for dividing said sheets into a plurality of parts, each of the proper size to form at least one box, means on said entrance conveyer for alining said sheets with the slitting mechanism, a printer, means for feeding said slit sheets one after another to said printer, means for forming blanks from said sheets, means for folding the free ends of said blanks into knockdown box formation, means for securing said folded over free ends of the blanks together, driving mechanism, and means in connection with said driving mechanism for timing the operation of the various parts with relation to one another.

10. In a box making machine, slitting mechanism for dividing a sheet into a plurality of parts each of the proper size to form at least one box, means for moving the sheets through said slitting mechanism, conveyer means for advancing the cut sheets from said slitting mechanism in a direction at right angles to their former direction of travel, mechanism for forming boxes from said cut sheets, means for feeding sheets to said mechanism, and means for transferring the sheets one at a time from said conveyer means to said box forming mechanism feeding means.

11. In a box making machine, slitting mechanism for dividing a sheet into a plurality of parts each of the proper size to form at least one box, means for moving the sheets through said slitting mechanism, conveyer means for advancing the cut sheets from said slitting mechanism in a direction at right angles to their former direction of travel, mechanism for forming boxes from said cut sheets, means for feeding sheets to said mechanism, and high speed roller means for transferring the sheets one at a time from said conveyer means to said box forming mechanism feeding means.

12. A unitary box making machine for receiving plain uncut sheets of material, comprising means for conveying said sheets of material through the machine, means for cutting said sheets to a desired size while passing through the machine, means for cutting box blanks from said cut sheets, and means for forming boxes from said blanks.

13. In a unitary box making machine for receiving plain uncut sheets of material, comprising means for conveying said sheets of material through the machine, means for slitting said sheets into a plurality of units each of a proper size for forming a box, means for cutting box blanks from said cut sheets, and means for forming boxes from said blanks.

14. A unitary box making machine for receiving plain uncut sheets of material, comprising means for conveying said sheets of material through the machine, means for slitting said sheets into a plurality of units each of a proper size for forming at least one box, means for cutting box blanks from said cut sheets, and means for forming boxes from said blanks.

15. As a unitary construction, a machine for forming a plurality of knockdown boxes from a single sheet of plain, uncut material, comprising means for conveying said sheet of material, means for slitting said sheet into a plurality of units each of the proper size for forming at least one box, means for cutting box blanks from said units, and means for forming each of said blanks into knockdown box formation.

16. As a unitary construction, a machine for forming a plurality of knockdown boxes from a single sheet of plain, uncut, material, comprising means for conveying said sheet of material, means for slitting said sheet into a plurality of units each of the proper size for forming a plurality of boxes, additional means for slitting each of said units into a plurality of sections each of the proper size for forming one box, means for cutting box blanks from said units, and means for forming each of said blanks into knockdown box formation.

17. As a unitary construction, a machine for forming a plurality of knockdown boxes from a single sheet of plain uncut material, comprising means for conveying said sheet of material, means for slitting said sheet into a plurality of units, means for arranging said units in single file, additional means for slitting each of said units into a plurality of sections each of the proper size for forming a single box, means for arranging said slit sections in single file, means for cutting box blanks from said cut units, and means for forming each of said blanks into knockdown box formation.

18. As a unitary construction, a machine for forming a plurality of box blanks from a single sheet of plain uncut material, comprising two substantially parallel but offset conveyers, means in connection with one of said conveyers for slitting said sheets into a plurality of units each of a proper size for forming at least one box, box forming mechanism in connection with said other conveyer, a transverse conveyer operable between said two parallel conveyers, and means between said transverse conveyer and the conveyer carrying the box forming mechanism for arranging the cut units in single file as they are delivered by said transverse conveyer.

19. As a unitary construction, a machine for forming a plurality of knockdown boxes from a single sheet of plain uncut material, comprising two substantially parallel but offset conveyers, means in connection with one of said conveyers for slitting said sheets into a plurality of units each of a proper size for forming a plurality of boxes, box forming mechanism in connection with said other conveyer, a transverse conveyer operable between said two parallel conveyers, means between said transverse conveyer and the conveyer carrying the box forming mechanism for arranging the cut units in single file as they are delivered by said transverse conveyer, means on the conveyer carrying the box forming mechanism for additionally slitting said units into a plurality of sections each of the proper size for forming a box, and means for arranging said slit sections in single file.

20. As a unitary construction, a machine for forming printed knockdown boxes from sheets of material, comprising a printing machine, mechanism for cutting blanks and forming boxes from said printed sheets, and means for conveying the sheets through the machine including a conveyer of substantial length leading from said printing machine to said cutting and forming mechanism to provide a sufficient interval of time in the progress of the sheets so that the printing will be thoroughly dry when the sheets enter said mechanism.

21. As a unitary construction, a machine for forming knockdown boxes from plain, uncut sheets of material, comprising means including a series of conveyers for transporting said sheets of material through the machine, means for cutting said sheets to a desired size while passing through the machine, means for cutting box blanks from said cut sheets, and means for forming said blanks in a knockdown box formation.

22. As a unitary construction, a machine for forming knockdown boxes from plain, uncut sheets of material, comprising means including a series of conveyers for transporting said sheets through the machine, means for cutting said sheets to a desired size while passing through the machine, means for cutting box blanks from said cut sheets, means for folding the free ends of said blanks in a knockdown box formation, and means for securing the free ends of the blanks together.

23. As a unitary construction, a machine for forming a plurality of knockdown boxes from a single sheet of plain, uncut material, comprising means including a series of conveyers for transporting said sheet of material through the machine, means including rotary cutters for slitting said sheet into a plurality of units each of the proper size for forming a box, means for cutting box blanks from said units, and means for forming said blanks in a knockdown box formation.

24. As a unitary construction, a machine for forming a plurality of knockdown boxes from a single sheet of plain, uncut material, comprising means including a series of conveyers for transporting said sheet through the machine, means including rotary cutters for slitting said sheet into a plurality of units each of the proper size for forming a box, means for cutting box blanks from said units, means for folding the free ends of said blanks into knockdown box formation, and means for securing the free ends of the blanks together.

25. As a unitary construction, a machine for forming knockdown boxes from plain, uncut sheets of material, comprising means for conveying said sheets of material through the machine, means for cutting said sheets to a desired size while passing through the machine, printing mechanism, means for cutting box blanks from each of said cut and printed sheets, and means for forming said blanks in a knockdown box formation.

26. As a unitary construction, a machine for forming knockdown boxes from plain, uncut sheets of material, comprising means for conveying said sheets of material through the machine, means for cutting said sheets to a desired size while passing through the machine, printing mechanism, means for cutting box blanks from each of said cut and printed sheets, means for folding the free ends of said blanks in a knockdown box formation, and means for securing the free ends of the blanks together.

27. As a unitary construction, a machine for forming a plurality of knockdown boxes from a single sheet of plain, uncut material, comprising means for conveying said sheet of material, means for slitting said sheet into a plurality of units each of the proper size for forming a box, printing mechanism, means for cutting box blanks from said slit and printed units, and means for forming said blanks in a knockdown box formation.

28. As a unitary construction, a machine for forming knockdown boxes from plain, uncut sheets of material, comprising means for conveying said sheets of material through the machine, means for cutting said sheets to a desired size while passing through the machine, printing means, means for cutting box blanks from said cut and printed sheets, means for forming said blanks in a knockdown box formation, and inter-related driving mechanism for said conveying means and said other means for timing the travel of said sheets with relation to the operation of said other means.

In testimony whereof, we affix our signatures.

EMERY L. WALKER.
ARTHUR W. WERNER.